United States Patent
Snow et al.

(10) Patent No.: US 8,712,812 B2
(45) Date of Patent: Apr. 29, 2014

(54) STRATEGIC PLANNING MANAGEMENT

(75) Inventors: Patricia Snow, Charlotte, NC (US); Steven D. Clement, Charlotte, NC (US)

(73) Assignee: Wells Fargo Bank, N.A., Charlotte, NC (US)

( * ) Notice: Subject to any disclaimer, the term of this patent is extended or adjusted under 35 U.S.C. 154(b) by 894 days.

(21) Appl. No.: 12/342,052

(22) Filed: Dec. 22, 2008

(65) Prior Publication Data

US 2010/0161360 A1 Jun. 24, 2010

(51) Int. Cl.
*G06Q 10/00* (2012.01)

(52) U.S. Cl.
USPC .......................... 705/7; 705/8; 705/9; 705/10

(58) Field of Classification Search
USPC ................................................ 705/7, 8, 9, 10
See application file for complete search history.

(56) References Cited

U.S. PATENT DOCUMENTS

| | | | | |
|---|---|---|---|---|
| 2002/0042731 A1* | 4/2002 | King et al. | | 705/10 |
| 2004/0143470 A1* | 7/2004 | Myrick et al. | | 705/7 |
| 2006/0143219 A1* | 6/2006 | Smith et al. | | 707/102 |
| 2007/0078831 A1* | 4/2007 | Relvas | | 707/3 |
| 2008/0255912 A1* | 10/2008 | Christiansen et al. | | 705/8 |

OTHER PUBLICATIONS

"SWOT analysis." Wikipedia, The Free Encyclopedia. Mar. 23, 2009, 16:29 UTC. Mar. 23, 2009 <http://en.wikipedia.org/w/index.php?title=SWOT_analysis&oldid=279175402>. 6 pages.

BNET Staff. "Analyzing Your Business's Stregnths, Weaknesses, Opportunities, and Threats." BNET. 2007. <http://www.bnet.com/2403-13241_23-53001.html?tag=content;col1>. 4 pages.

"Advancing Statewide Spatial Data Infrastructures in Support of the National Spatial Data Infrastructure (NSDI): Strategic Plan Template." NSGIC. Mar. 2006. 25 pages.

"Planning for Success 2007." Microsoft Power Point Template. <http://office.microsoft.com/en-us/templates/TC300006741033.aspx>. 2 pages.

"Strategic Planning Tools." Systems2win. Mar. 23, 2009. <http://systems2win.com/solutions/biz_planning.htm>. 4 pages.

* cited by examiner

*Primary Examiner* — Nga B. Nguyen

(74) *Attorney, Agent, or Firm* — Kegler Brown Hill & Ritter; James J. Pingor

(57) ABSTRACT

An information technology (IT) strategic management system (and corresponding methodology) that enhances efficiency and effectiveness of IT planning processes and projects is provided. In particular aspects, the systems commence with a review of current IT state and strategy influencers. The state is analyzed to establish (or alternatively, to update) a strategy summary. The strategy summary can be presented for leadership approval and subsequently communicated to stakeholders for deployment.

20 Claims, 19 Drawing Sheets

Please Delete this Page from your Strategy & Plan Document.

*A Best Practice:* Print this instructional template to use as a guide. Then open the regular template (without instructions) and follow the instructions below.

Using this CIO Strategy and Plan Instructional Template

*Note: These instructional text boxes will guide you as you prepare your strategy. Delete them when they are no longer needed.*

*For additional instructions and samples, see Create an IT Strategy.*

Step 1:

Save and Name Your Document: To use this template, first save it using the following naming convention:

CIO Division Strategy and Plan_DRAFT_mmddyy
Example: CBT Strategy and Plan_DRAFT_120808

If you have a previous version of your strategy, you can add the new version number after the name.
Example: CBT Strategy and Plan v2.5_DRAFT_120808

During the draft phase, you can save the date as your versioning tool. When you approve the document on subsequent days, use Save As to rename the document with the current date. Delete the word DRAFT from the filename of your final document.

Hint: To avoid a jumble of temp files in your folder, after you save and name (or rename) your document, close the document, close Word, refresh (View>Refresh) the folder, and then reopen the document that has the current date. The document with the previous date is now your backup file.

Step 2:

Find and Replace: Select Edit > Replace… In the Find what: box, type <capability/function>. In the Replace with: box, type the name of your capability or function. Then click the Replace All button. There should be 42 replacements. Save your document to capture these changes.

FIG. 16

STRATEGIC PLANNING MANAGEMENT

BACKGROUND

Today, in many corporations, IT (information technology) defines the capability of IT strategic planning as a process of translating company priorities, in conjunction with business partner objectives, to build value-focused technology offerings that are aligned with business services. This broad IT strategy can serve as a foundation for designing sound IT products and services.

Most often, IT business strategy is business-driven, based upon a defined set of inputs and drivers. It describes how technology will support an organization's business goals and strategies. One principal purpose is to create understanding, to promote interaction, and ultimately to receive IT governance approval. Approval of capability and function strategies empowers the organizational leaders (e.g., Accountable Capability Leaders (ACLs) and Function Leaders) to execute on their strategies.

For example, the ACLs are usually accountable for the a large number of core capabilities of IT and work with other responsible leaders to ensure there are single processes, consolidated policies/standards, benchmarking measures and a strategic plan in place. ACLs span across the IT organization. The Function Leaders are leaders within Technology Services and organizationally accountable for the core functions of Tech Services.

IT strategic planning is a core capability of an organization's IT Operating Model (ITOM). Strategy Development is a core step included in the ITOM lifecycle for capability improvement. Unfortunately, conventional approaches to IT strategic planning are manually intensive which leads to inefficiency and large expense. Additionally, because traditional IT strategic planning approaches require human input and facilitation, they are also prone to human error, procrastination and mistake which increase inefficiency and expense.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises IT (information technology) strategic management systems (and corresponding methodologies) that enhance efficiency and effectiveness of IT planning processes and projects. In particular aspects, the systems commence with a review of current IT state and strategy influencers. The state is analyzed to establish (or alternatively, to update) a strategy summary. The systems are enabled by specialized computer-implemented components that gather, search, retrieve, solicit, analyze, transform, present and communicate information related to strategic IT summaries.

Via specific components, strategists participate in strategy collaboration sessions to refine and/or adapt strategies as desired or appropriate. The strategy can be presented to leadership for approval and subsequently communicated or deployed to team members and/or stakeholders. The subject innovation provides mechanisms and components by which organizations can improve efficiency, effectiveness and performance in developing and implementing IT process strategies.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

FIGS. 11A & B illustrate an example UI for viewing strategies in accordance with an aspect of the innovation.

FIG. 14 illustrates an example detail strategy view UI in accordance with aspects of the innovation.

FIG. 16 illustrates an example portion of a strategy template in accordance with an aspect of the innovation.

DETAILED DESCRIPTION

Figure 1:
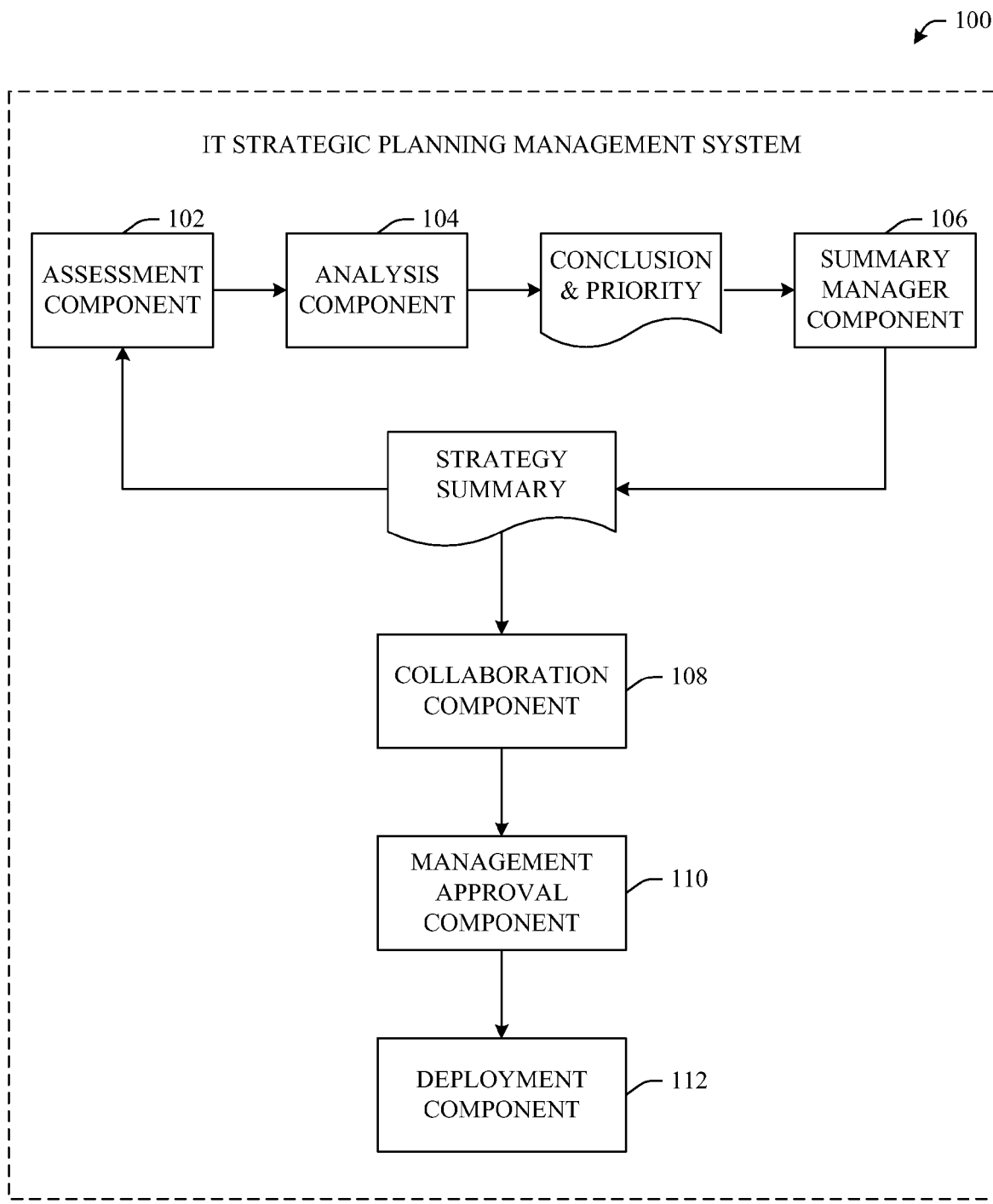
FIG. 1 illustrates an example strategic planning management system in accordance with aspects of the innovation.

The following terms are used throughout the description, the definitions of which are provided herein to assist in understanding various aspects of the subject innovation.

Artifact refers to an object produced or shaped by human craft. It is used in this documentation to refer to tools or documents.

Influencers refer to internal and external factors that influence IT (information technology) strategic planning decisions. Some examples of internal influencers are corporate goals, business partner goals, and security considerations. External influencers include industry trends, emerging technology, and peer comparisons, among others.

IT Operating Model (ITOM) refers to a model that represents a way enterprise IT operates as a high-performing services provider. It provides the foundational structures necessary for operating, managing, and evolving IT as the business and environment change.

IT Strategy refers to a business-driven strategy based on a predetermined, defined or inferred set of inputs and drivers. It describes how technology will support enterprise business strategies. Some principal purposes are to create understanding, to promote interaction, and ultimately to receive IT governance approval. The success of the overall IT Strategy relies on the cumulative effect of multiple underlying supporting strategies produced by the IT Capability and Function groups.

IT Strategic Planning refers to a core capability of the IT Operating Model (ITOM), and Strategy Development is a core step included in the ITOM lifecycle for capability improvement. IT defines the capability of IT Strategic Planning as the process of translating company priorities, in conjunction with business partner objectives, to build value-focused technology offerings that are aligned with business services. The broad IT strategy will serve as a foundation for designing sound IT products and services.

Strategy refers to a long-term (or short-term) plan of action designed to achieve a set of business priorities or goals. An organization's strategy can provide guidance for defining functional and divisional plans.

Strategic Planning generally refers to an organization's process of defining its strategy and making decisions on allocating its resources to pursue this strategy, including its capital and its people.

Toolkit is a group of tools designed to facilitate the Strategic Planning Process. In aspects, the IT Strategic Planning toolkit can include at least five IT Strategic Planning components and two data repositories:

IT Strategic Planning Introduction
IT Strategic Planning Toolkit
IT Strategy
IT Strategy Influencers
Technology Planning Guide
IT Strategy Summaries
Detailed IT Strategies Vision Statement refers to a declaration of what the organization wants to become. IT's vision statement describes the future sought to create in support of the corporate priorities and business strategies, goals, and objectives.

Strategy Map is a diagram that describes how an organization creates value by connecting strategic objectives in explicit cause-and-effect relationship with each other in Balance ScoreCard objectives (e.g., financial, customer, processes, learning and growth).

IT Governance refers to the responsibility of the board of directors, leaders and executive management. It consists of the leadership and organizational structures and processes that ensure IT sustains and extends the organization's strategies and objectives.

Capability refers to an activity that is important for IT to effectively plan, manage, and deliver technology solutions to business partners and customers. These activities span across the IT organization.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component" and "system" are intended to refer to a computer-related entity, either hardware, a combination of hardware and software, software, or software in execution. For example, a component can be, but is not limited to being, a process running on a specialized processor, a processor, an object, an executable, a thread of execution, a program, a specialized machine and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

While certain ways of displaying information to users are shown and described with respect to certain figures as screenshots, those skilled in the relevant art will recognize that various other alternatives can be employed. The terms "screen," "web page," and "page" are generally used interchangeably herein. The pages or screens are stored and/or transmitted as display descriptions, as graphical user interfaces, or by other methods of depicting information on a screen (whether personal computer, PDA, mobile telephone, or other suitable device, for example) where the layout and information or content to be displayed on the page can be stored in memory, database, or another storage facility.

Referring initially to the drawings, FIG. 1 illustrates a system 100 that enables IT strategic planning management in accordance with aspects of the innovation. While numerous components are illustrated in relation to the IT strategic planning management system 100, it is to be understood that the innovation as described herein is not intended to be limited merely by the combination of all of the components shown in FIG. 1. Rather, it is to be appreciated that the combination of components shown in FIG. 1 is but one aspect of the innovation. Similarly, it is to be understood that other aspects can employ a subset of the components (and corresponding processes)—these alternative aspects are to be included within the scope of the innovation and claims appended hereto.

Generally, system 100 can include an assessment component 102, analysis component 104, summary manager component 106, collaboration component 108, management approval component 110 and a deployment component 112. Together, these components (102-112) facilitate IT strategic planning management in accordance with aspects. Each of these components (102-112) as well as their respective processes, features, functions and benefits will be described with regard to the figures set forth below. Additionally, it is to be understood that each of the described components can be enabled by way of specialized computers and associated user interfaces (UIs), processors, analyzers, renderings, etc.

The assessment component 102 facilitates review of current state and strategy influencers. Essentially, this component 102 enables a thorough review of the existing current state and the strategy influencers. It will be understood that these inputs can influence the foundation of the strategy.

The analysis component 104 can be employed to evaluate the current state of a business situation. For example, in order to determine the primary focus of a two to three year strategy, an analysis of the current state can be performed to collect findings and priorities.

The summary manager component 106 can be used to create and/or update a strategy summary. In operation, the summary management component 106 can provide an interface (or series of UIs) which facilitates strategy summary entry. Essentially, the interface can provide a series of forms and templates that guide a user through various components of an IT strategy summary, which can include:

Vision and Rationale for Change;
Current State as it relates to People, Technology, Process & Delivery;
Future State as it relates to People, Technology, Process & Delivery;
Upcoming Year Initiatives and Financial Projections as they relate to People, Technology, Process & Delivery;
Strategy Timeline Strategy Overview for presentation; and
Strategy Metrics.

It is to be understood that the series of forms, templates and UIs used in connection with the innovation as described herein can adapt based upon user input and analysis thereof. In other words, as a user inputs data, subsequent UIs can be selected based at least in part upon the content of the date inputted into a previous UI.

The collaboration component 108 enables users to participate in strategy collaboration sessions. For example, strategists can present their strategies in multiple (e.g., two) sets of collaboration sessions, first with architecture, workforce management and process office representatives and second with capability and function leaders. Capability and function leaders can use information gathered in the sessions as input into their strategies. Here, capability and function leaders will be able to provide input into a subsequent period (e.g., next year's) strategies, for example via adaptable UIs.

The management approval component 110 enables users to present their strategy to leadership for approval. In other words, leaders and management can have the ability to review strategies developed by the capability and function leaders. Once the strategy has been reviewed and approved, the IT leader can be empowered to execute on the strategy.

The deployment component 112 enables approved strategies to be communicated to interested parties. Here, once the strategy has been approved by leadership, the processes of the deployment component 112 can be employed to further communicate further to team members and stakeholders. Capability leaders will have their strategy linked to their ITOM capability page.

Figure 2:
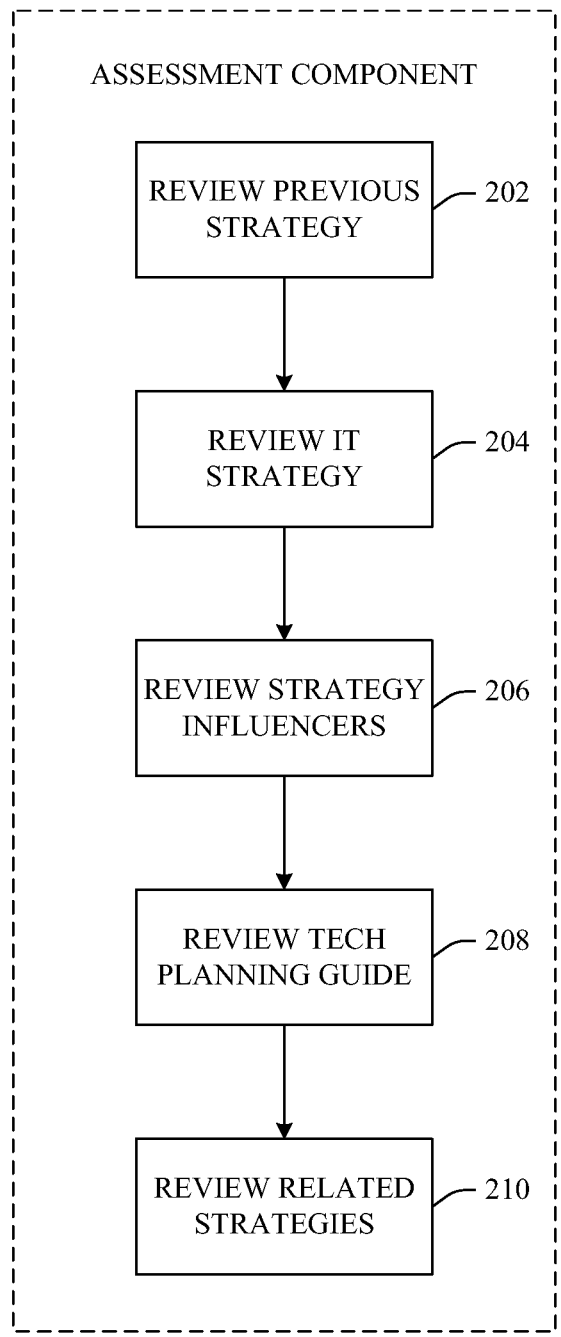
FIG. 2 illustrates an example flow chart of procedures that facilitate assessment in accordance with an aspect of the innovation.

FIG. 2 illustrates an example methodology or process flow of an assessment component 102 in accordance with an aspect of the innovation. While, for purposes of simplicity of explanation, the one or more methodologies (or process flows) shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Additionally, as described above, the features, functions and benefits of each act of the process flows can be implemented by way of adaptable UIs and other data processing components.

Generally, the assessment component 102 enables a user to review a current strategy and to consider a set of influencers on the strategy early in the overall planning process. As illustrated, at 202, it can be particularly helpful to review previous or existing strategy documentation and strategy performance metrics. This information identifies some basis for changes that should be incorporated in a new strategy. As the strategic planning process is adopted, a user should be able to review the previously documented strategy summary.

At 204, the current IT strategy can be produced by the strategic planning team and vetted with leadership. As described herein, the innovation can enhance IT vision, IT guiding principles, business-translated strategies, high-level strategic statements of IT capabilities and functions, and the architecture stack for new development.

Strategy influencers are reviewed at 206. Here, it is to be understood that strategy influencers can include both internal and external influencers. Example influencers are listed below:

Internal Influencer Checklist:
Corporate Priorities, Business Strategies and IT Goals & Objectives;
Recent IT Performance;
Current IT Challenges;
Capability & Function Analysis;
Risk Analysis;
Financial Analysis;
Workforce Management Analysis;
Application Portfolio Analysis;
Policies & Standards;
Quality Management; and
Existing Future State Process Models.
External Influencer Checklist:
Industry Trends & Emerging Technology;
Globalization;
Vendor Management; and
Benchmarking.

A technology planning guide is reviewed at 208. Given the breadth of technology used within many organizations, it is prudent to become familiar with current technologies. The information outlined in this guide highlights key technology projects and initiatives with the potential to impact planning for the next 6 to 12 months, or other designated time period.

Finally, with regard to the assessment component 102, related strategy summaries can be reviewed at 210. To understand the perspective and future state plans of closely related capabilities and functions, a user should review their strategy summaries. Accordingly, the assessment component 102 provides for a search function to view other summaries, for example summaries on the IT strategic planning team site. The user can browse each of the strategies individually, or can perform searches of designated topics as desired.

Figure 3:
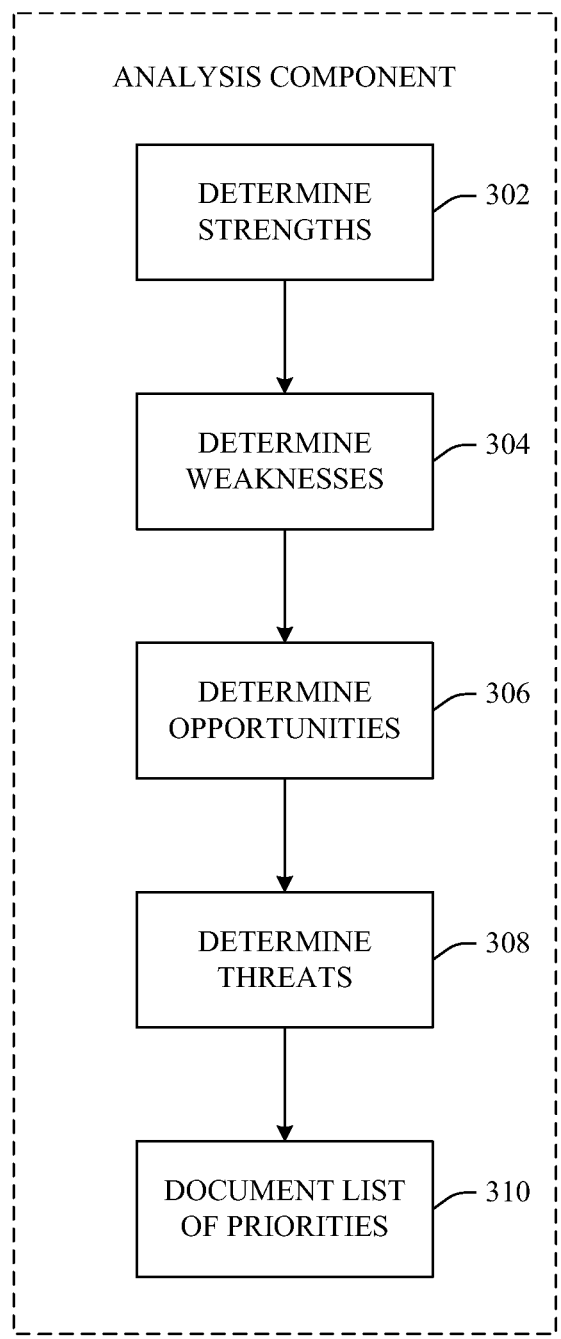
FIG. 3 illustrates an example flow chart of procedures that facilitate analysis in accordance with an aspect of the innovation.

Turning now to FIG. 3, an example process flow diagram of an analysis component 104 is shown. To determine the primary focus (e.g., priorities) of the future state, an analysis of the current situation can be performed. In one aspect of the innovation, one very effective method is a SWOT analysis (also known as TOWS analysis). The SWOT analysis is a technique for understanding strengths and weaknesses, and for evaluating the opportunities and threats at issue.

What makes SWOT particularly powerful is that it can help uncover opportunities that can be taken advantage of in the planning process. It is to be understood that by understanding the weaknesses of the business, one can manage and eliminate threats that would otherwise be caught unexpectedly. The SWOT analysis can also be applied to competitors. As this is completed, one will begin to see how and where competition is beneficial.

By using the SWOT framework to evaluate an organization and applicable competitors, one can start to craft a strategy that distinguishes the competitors. This strategy can assist to compete successfully in the market. Carrying out this analysis will often be illuminating—both in terms of pointing out what needs to be done, and in putting problems into perspective. Strengths and weaknesses are often internal to an organization. Opportunities and threats often relate to external factors. For at least these reasons, the SWOT analysis is sometimes referred to as Internal-External.

At 302, strengths of the current state are determined. For instance, interface input pages (e.g., adaptable UIs) facilitate entry of specific information. By way of example, the following questions can help to determine strengths:

What advantages does your organization, capability, or function have?
What do you do better than anyone else?
What unique or lowest-cost resources do you have access to?
What do people in your market see as your strengths?

These questions can be considered from an internal perspective, and from the point of view of customers and people in the market. It is to be appreciated that, in looking at strengths, it is beneficial to think about them in relation to competitors. For example, if all competitors provide high-quality products, then a high-quality production process is not a strength in the market; it is often considered a necessity.

At 304, weaknesses of current state are determined. For instance, interface input pages facilitate entry of specific information. For example, the following questions will help to determine weaknesses:

What could you improve?
What should you avoid?
What are people in your market likely to see as weaknesses?

Similar to strengths, weaknesses can be considered from an internal and external basis—for example, Do other people seem to perceive weaknesses that you do not see? Are your competitors doing any better than you? In establishing a planning strategy, it is particularly helpful to be realistic upon the planning stage to therefore face any unpleasant truths early in the process.

Opportunities are determined or established at 306. Here, the following questions can be asked to determine opportunities:

Where are the good opportunities facing you?
What interesting trends are you aware of?

It will be understood that useful opportunities can come from:
Changes in technology and markets on both a broad and narrow scale;
Changes in government policy related to your field;
Changes in social patterns, population profiles, lifestyle changes, etc.; and
Local events.

A useful approach to looking at opportunities is to look at strengths and determine whether any of the strengths lead to any opportunities. Alternatively, it is helpful to determine whether any opportunities can become available by eliminating weaknesses.

Continuing with the discussion of the example process flow of the analysis component 104, at 308, threats can be determined by gathering information, for example, by way of interface input screens, forms or templates. In one aspect, the following queries can help to determine threats:

What obstacles do you face?
What is your competition doing?
Are the required specifications for your job, products or services changing?
Is changing technology threatening your position?
Are there issues with the costs of your services?
Could any of your weaknesses seriously threaten your business?

After reviewing all the inputs and drivers of the strategy, a list of the key goals and objectives or priorities that are sought to achieve in the next two to three years (or other time period) can be compiled at 310. This list of priorities will aid in the creation of the future state strategy statements.

Figure 4:
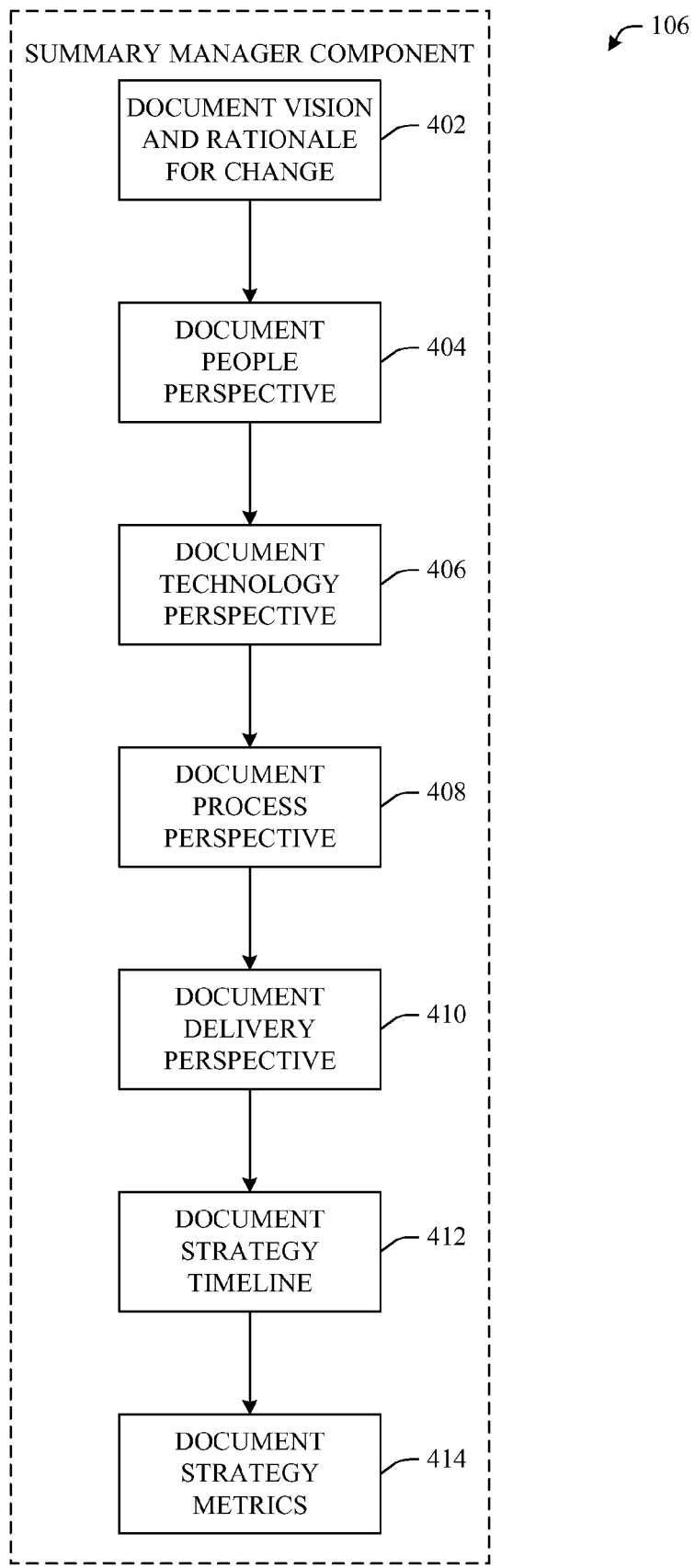
FIG. 4 illustrates an example flow chart of procedures that facilitate summary management in accordance with an aspect of the innovation.

Referring now to FIG. 4, an example process flow of an example summary manager component 106 is shown. In accordance with the summary manager component 106, a series of input screens and/or templates can be employed to gather information used to establish the summary. In one aspect, the strategy summary template is developed by a team of responsible IT strategists. This team can establish templates that enable a good high-level strategy to be generated by documenting vision, rationale for change, current and future states, and the next-year initiatives and financial projections for the people, technology, process and delivery dimensions. This example is illustrated in the process flow of FIG. 4.

At 402, vision and rationale for change can be documented. In an example, input screens, pages, forms or templates can be provided in order to gather information used to establish the summary. The vision can be a two- to three-year obtainable objective. For instance, what does 'finished' look like? The vision can describe the target state of capability, function, or organization that can be accomplished in two to three years, or some other desired period.

People perspective is documented (or established) at 404. Considering the People/Workforce Management dimension of capability, function, or organization and using the inputs, drivers and priorities collected as described supra, the future state, the current state, the next-year initiatives, and the financial projections associated with the stated initiatives can be gathered or established.

The future state describes major changes required to enable target workforce objectives to become a reality;
The current state describes the current situation with regard to workforce;
The next-year initiatives articulate the high-level tasks that will lead to tangible results, ultimately achieving the target/future state (e.g., consider 90-day increments); and The financial projections include the statements of costs and savings, depicting the projected efficiencies or costs related to workforce throughout the vision cycle.

Considering the technology dimension of capability, function, or organization and using the inputs, drivers, and priorities collected in the previous section of this document, the future state, current state, next-year initiatives, and the financial projections associated with the stated initiatives at 406, information can be gathered to assist in development of the summary. For example:

The future state should describe the major changes required to enable target technology objectives to become a reality;

The current state describes the current situation with regards to technology;

The next-year initiatives articulate the high-level tasks that will lead to tangible results, ultimately achieving the target/future state (e.g., consider 90-day increments); and The financial projections include the statements of costs and savings, depicting the projected efficiencies or costs related to technology throughout the vision cycle.

At 408, considering the process dimension of capability, function, or organization and using the inputs, drivers, and priorities collected in the previous section of this document, list the future state, current state, next-year initiatives, the financial projections associated with the stated initiatives can be gathered to assist in generation of a summary. For example:

The future state should describe the major changes required to enable target process objectives to become a reality;

The current state describes the current situation with regards to process;

The next-year initiatives articulate the high-level tasks that will lead to tangible results, ultimately achieving the target/future state (e.g., consider 90-day increments); and The financial projections include the statements of costs and savings, depicting the projected efficiencies or costs related to process throughout the vision cycle.

Considering the delivery dimension of capability, function, or organization at 410 and using the inputs, drivers, and priorities collected in the previous section of this document, the future state, current state, next-year initiatives, the financial projections associated with the stated initiatives can be gathered to assist in establishment of the summary. For example:

The future state should describe the major changes required to enable target customer delivery objectives to become a reality;

The current state describes the current situation with regards to customer delivery and roll-out;

The next-year initiatives articulate the high-level tasks that will lead to tangible results, ultimately achieving the target/future state (e.g., consider 90-day increments); and The financial projections include the statements of costs and savings, depicting the projected efficiencies or costs related to customer delivery and roll-out throughout the vision cycle.

At 412, a strategy timeline can be established or documented—the strategy timeline can lay out the initiatives planned for the upcoming year to achieve the documented future state. The timeline can highlight most any dependencies associated with each of the initiatives. The timeline can assist in socializing strategy with leadership and team members responsible for the capability, function, or organizational objectives.

Finally, strategy metrics can be documented at 414. As part of an ongoing effort to improve the strategic planning process, metrics can be employed to measure strategies. When establishing a strategy, performance metrics can be employed to enhance effectiveness and success of the strategy.

Figure 5:
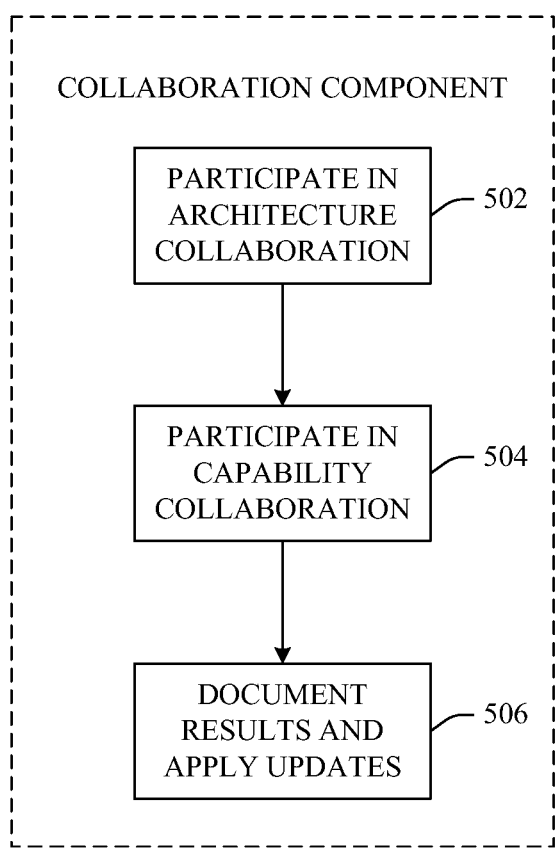
FIG. 5 illustrates an example flow chart of procedures that facilitate collaboration in accordance with an aspect of the innovation.

Turning now to a discussion of the collaboration component 108, FIG. 5 illustrates an example process flow in accordance with an aspect of the innovation. Here, the strategists, capability and function leaders can have an opportunity to discuss and review the strategies, architecture, workforce and process strategies in one or a series of collaboration sessions. These sessions can be facilitated, supplemented or otherwise enabled by way of data presentation (e.g., via UIs). In examples, the data can be organized, ranked, etc. based at least in part upon preference, policy, type, content, etc. The strategists can include the input collected in their strategies for the next year (or other time period). The capability and function leaders can include the input in their refreshed strategy that is to be completed by the end of the year (or other time period).

At 502, architecture, workforce and process collaboration sessions can be held. In one example, the first collaboration session will occur after the strategy has been approved by their business partner and before the strategies are communicated out more broadly to IT leadership. Most often, this session will include strategists, architecture, workforce and process representatives.

At 504, capability and function leader collaboration sessions can be held. Here, the strategists can update their strategies based on input collected in the first session before the second collaboration session. In aspects, there can be approximately one month (or other time period) between each collaboration session. The second session will include strategists, capability leaders and function leaders. In the example, capability leaders and function leaders will use the information collected as input into their strategies to be updated by the end of the year. In this session the capability and function leaders will have the opportunity to provide input into the subsequent (e.g., next year's) strategies for the different areas.

Finally, at 506, results are documented and updates (if applicable) are applied to the strategy. Here, the strategists, capability leaders and function leaders will update their strategies based on the input collected (or otherwise determined) in each of the collaborations sessions (502, 504).

Figure 6:
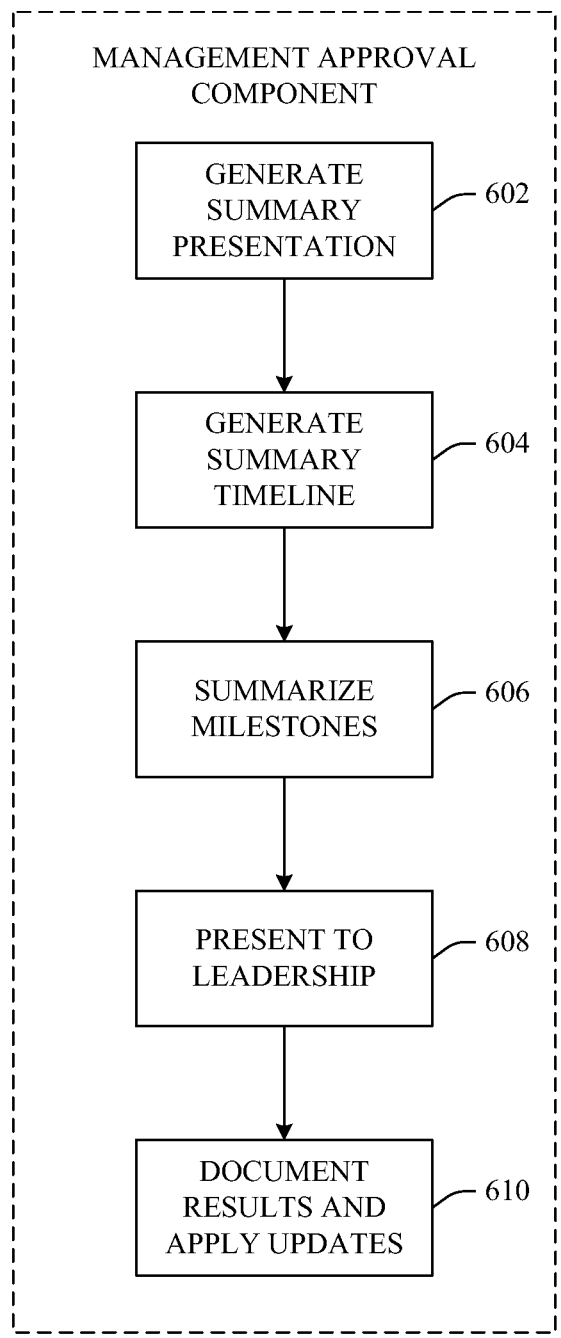
FIG. 6 illustrates an example flow chart of procedures that facilitate approval management in accordance with an aspect of the innovation.

Turning now to FIG. 6, an example process flow of a management approval component 110 is shown. The strategies developed can be reviewed with leadership for vetting and approval. Function leaders can review their strategies as part of their quarterly functional plan review. Once the strategies are approved, the strategy leader is empowered to execute on the two- to three-year (or other term) strategy and initiatives.

At 602, a summary presentation can be generated. The strategy can be presented to leadership in a format that is easy to review and decision. The innovation's strategy team site (for example, as shown in the figures that follow) is designed to allow a user to generate a report and an overview map from the strategy summary. Each strategy leader has the ability to enter the strategy content in different formats. Thus, after generating the full strategy report and map, the user can review what is generated to make sure it can be vetted and reviewed easily. In aspects, content can include bullets or other formatting for better or efficient review. Essentially, the innovation supports most any report configurations which provide the format for vetting and review. In addition to web-based input pages, it is possible for the content of the strategy summary to be placed in a word processing or other text-based template or form.

A summary timeline can be generated (and presented) at 604. For example, the innovation can generate a timeline from the tasks listed in the initiatives portion of the strategy. In other aspects a spreadsheet template can be employed to generate a timeline of the initiatives planned to achieve the future strategy.

Milestones are summarized at 606—either within the strategy summary, a word processor template, or in a separate document, important points to the strategy can be summarized. Here, the plans that are most critical to the success of the strategy can be highlighted to leadership.

The strategy can be presented to leadership at 608. The strategic planning team can produce a schedule for vetting and presenting the capability strategies to the CIO/CTO forum. In one aspect, the CTO can have a quarterly review schedule for the functional plans, including the developed functional strategies. The user can be proactive in determining when they will be required to review strategies so as to have adequate time to complete and socialize your strategy components.

Results are documented and updates applied at process stage 610. After the strategy is vetted and reviewed by leadership, one should allow time for rework and updates based on the input received from leadership. After the updates are complete, the strategy can be posted (or re-posted) to the strategic planning team site. Additionally, it is possible to verify or ensure that it can be accessed from the different access points. For example, each capability can have a capability site with a link to its strategy. The strategy link can connect to the strategy summary stored on the strategic planning team site. If it is decided to complete a detailed strategy document, that too can be stored on the strategic planning team site—an example team site is shown in the figures that follow.

Figure 7:
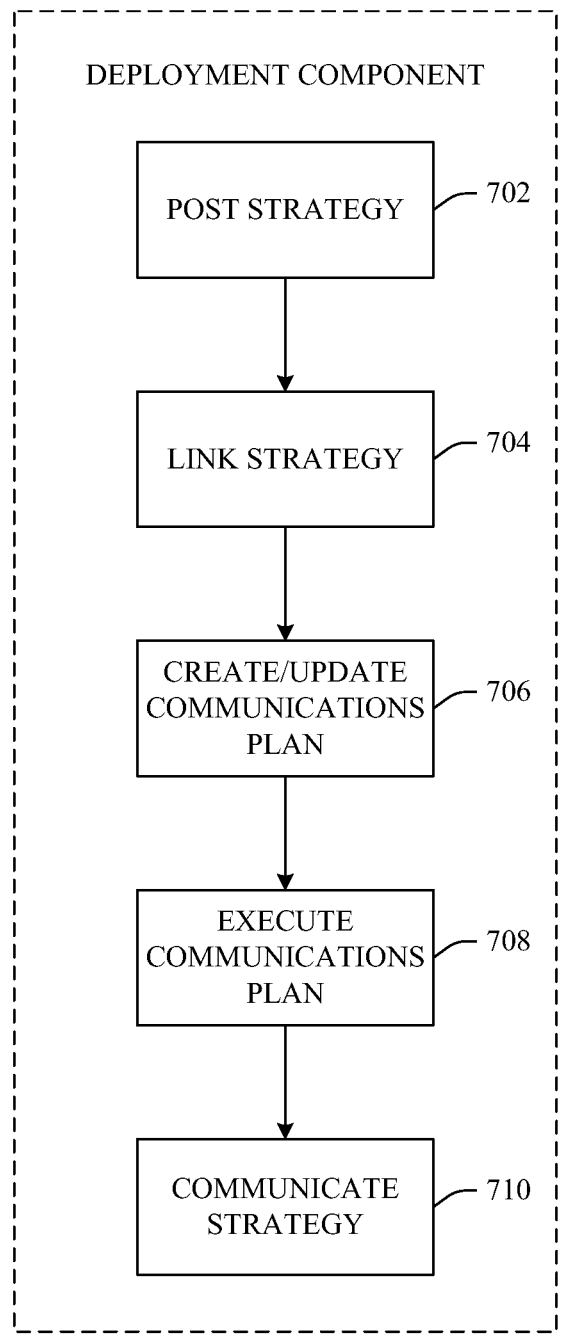
FIG. 7 illustrates an example flow chart of procedures that facilitate deployment in accordance with an aspect of the innovation.

Referring now to FIG. 7, an example process flow of a deployment component 112 is shown in accordance with an aspect of the innovation. Essentially, the deployment component 112 enables strategies to be communicated intra- and inter-organization as desired or appropriate. This communication can facilitate collaboration and enhance integration of strategies.

At 702, a strategy is posted, for example upon a team accessible site. It is to be understood that the site can be accessible via an enterprise intranet, the Internet or other network. In one aspect, the strategy can be posted to the team site, but if it was chosen to develop the strategy using another documentation tool (e.g., Web form, word processor template . . . ), the content can be posted into a strategy summary template or to the team site. It will be understood that, by adding to the strategy summary repository, other IT leaders can search, retrieve and view the strategy.

The strategy can be linked to accessible sites at 704. Continuing with the example, using the Web site in which the process and strategy documents were posted, links could be added for the new or updated strategy. Additionally, it is to be appreciated that metadata and other tags together with indexing can be applied to a strategy to facilitate effective search and retrieval.

A communications plan can be created and/or updated at 706. Here, the plan can be communicated based upon a user or organizational preference or policy. The user can develop a communication plan for communicating deliverables and changes, if applicable. Additionally, the method in which the user would like to communicate the strategy to leadership, team members, and more broadly in the organization can be added to the plan.

At 708, the communications plan can be executed—Following the communications plan, which should take into account the collaboration with other organizations, capabilities, and functions, appropriate communications can be sent out to appropriate stakeholders, leaders, etc.

Finally, the strategy can be communicated at 710. For example, the strategic planning team can assist in communicating out the approved strategy by documenting and distributing the highlights in an IT communication (e.g., newsletter, group mailing, electronic mail, bulletin board . . . ).

In accordance with the example process flows of each component (102-112) described supra, it is to be understood that the functionality of each of these components (102-112) enable data collection, analysis, manipulation, transformation, search/retrieval, presentation, etc. as described with regard to each of the processes. For example, data can be automatically input and collected by way of templates and forms. Additionally, as described above, adaptable forms and templates can be incorporated. As well, the data can be analyzed whereby a strategy or summary can be generated, stored and communicated as appropriate or desired. For instance, the information can be generated, stored and/or communicated based at least in part upon a preference, policy or inference.

Figure 8:
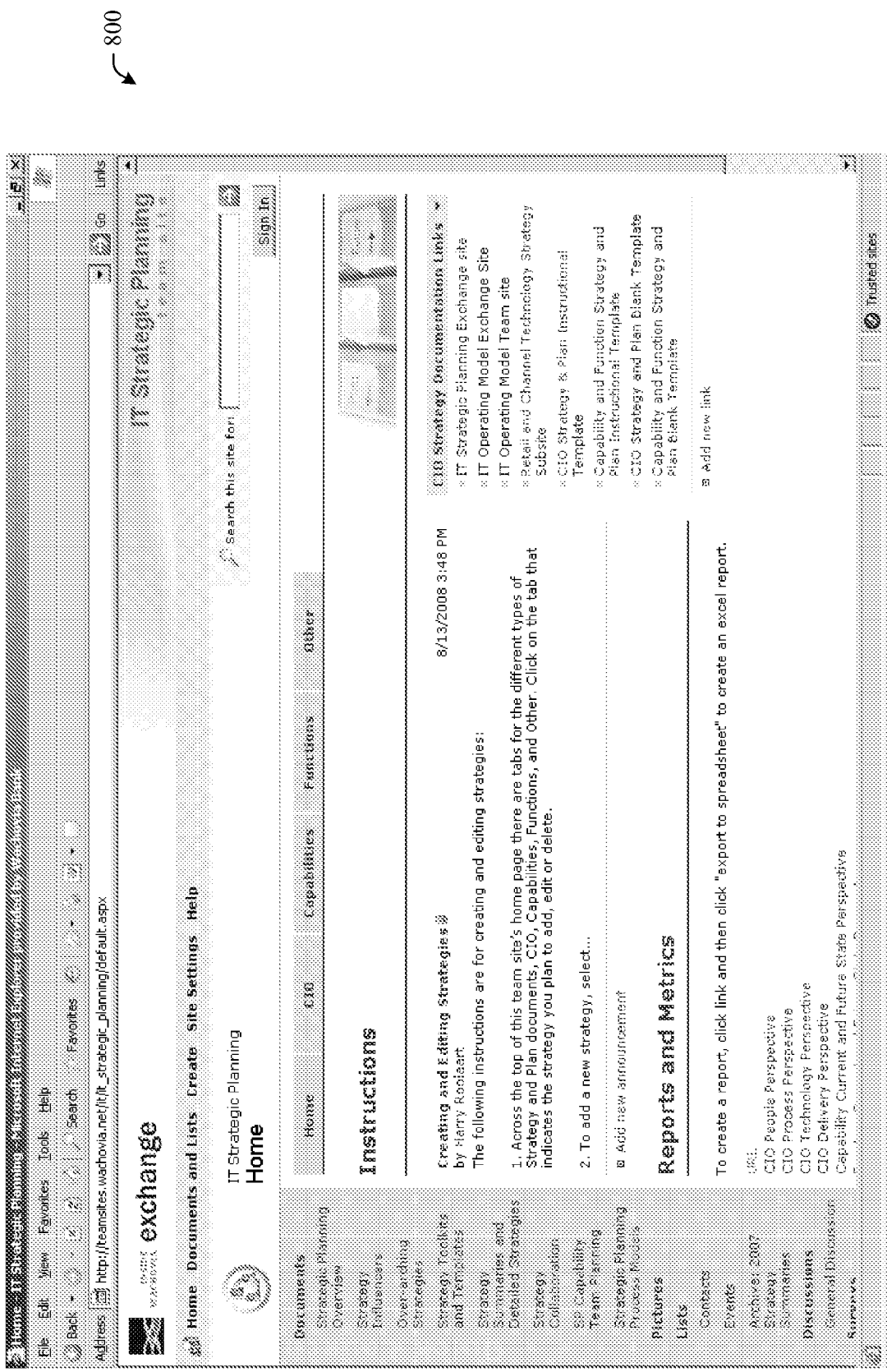
FIG. 8 illustrates an example team site home page in accordance with an aspect of the innovation.

Following is a discussion of an example IT strategic planning team site to create, update, search and view summaries and detailed strategy documents. FIG. 8 illustrates a link on an example team site page 800 which launches instructions to create and edit strategy summaries. As shown in the screen shot 800 of FIG. 8, a user is able to navigate the UI screens in order to establish strategy plans and summaries. It is to be understood that the components of system 100 of FIG. 1 are used to establish the appropriate interfaces as well as to effect the backend processing and transformations associated therewith.

Figure 9:
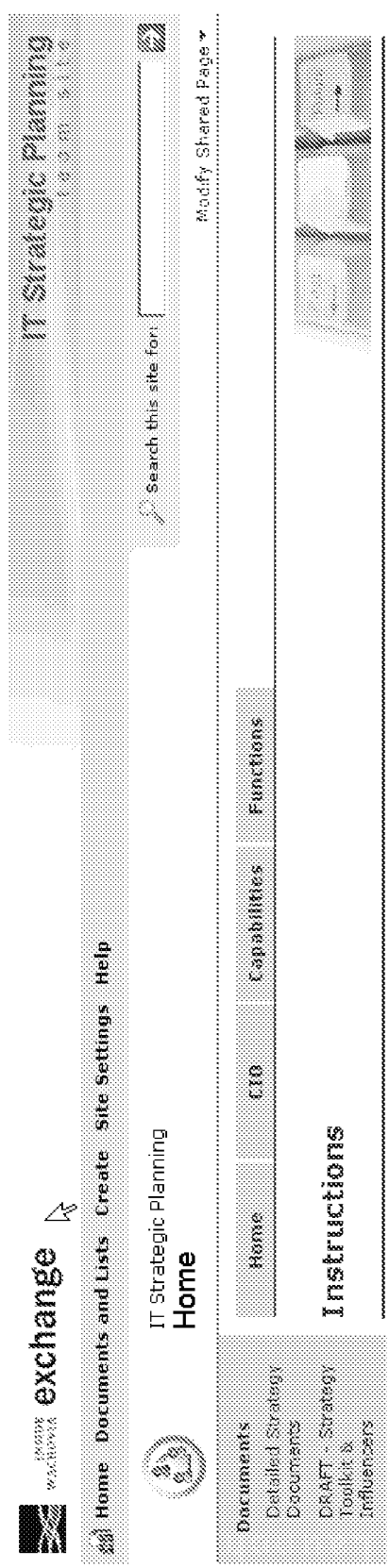
FIG. 9 illustrates an example search user interface (UI) in accordance with an aspect of the innovation.

FIG. 9 illustrates an example search UI 900 in accordance with aspects of the innovation. One of the primary objectives of creating the strategy repository is to facilitate searches across strategy summaries and detailed strategy documents. In the example, the search capability is located at the top right corner of the IT strategic planning team site as shown in FIG. 9.

Figure 10:
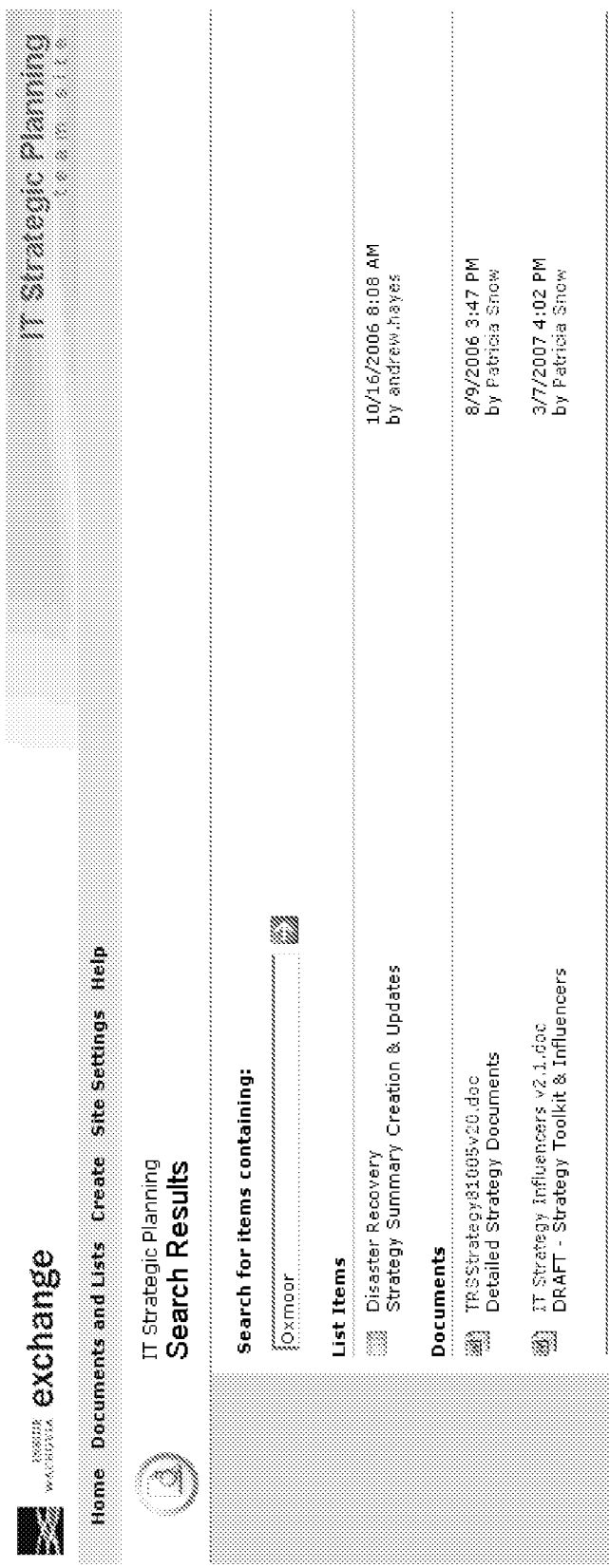
FIG. 10 illustrates an example strategy search in accordance with an aspect of the innovation.
Figure 12B:
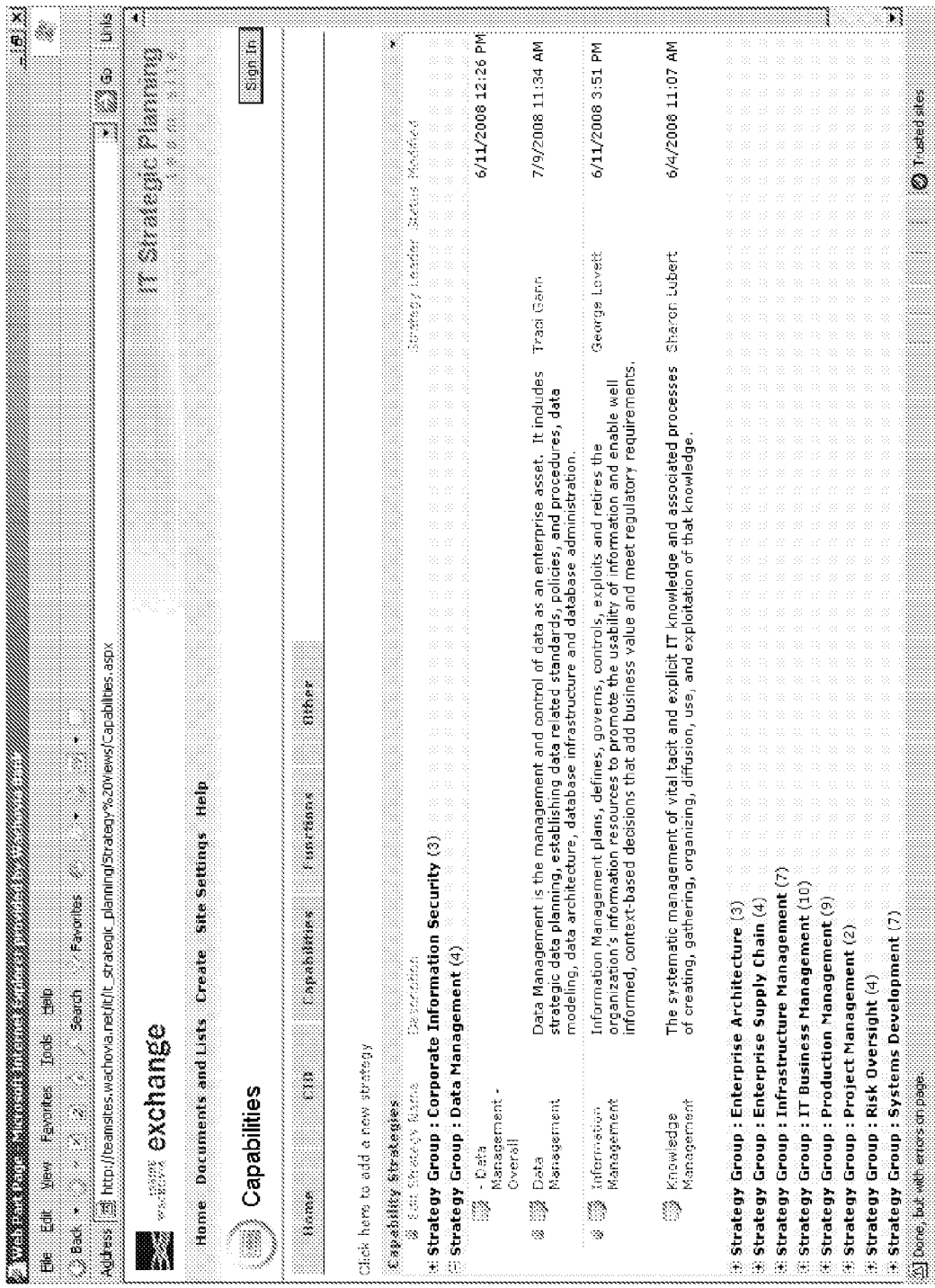
FIGS. 12A & B illustrate an example capabilities UI in accordance with an aspect of the innovation.

An example search is illustrated in FIG. 10. As illustrated in the example of FIG. 10, a search screen 1000 illustrates a search for items (e.g., summaries and documents) that contain the word "Oxmoor." As shown in screen print 1000, a list of summary forms and documents that contain the search criteria (e.g., "Oxmoor") are retrieved and rendered to the by way of the UI. It will be understood that the search, retrieval and rendering functionality is effected by way of the components of system 100 of FIG. 1.

Figure 11A:
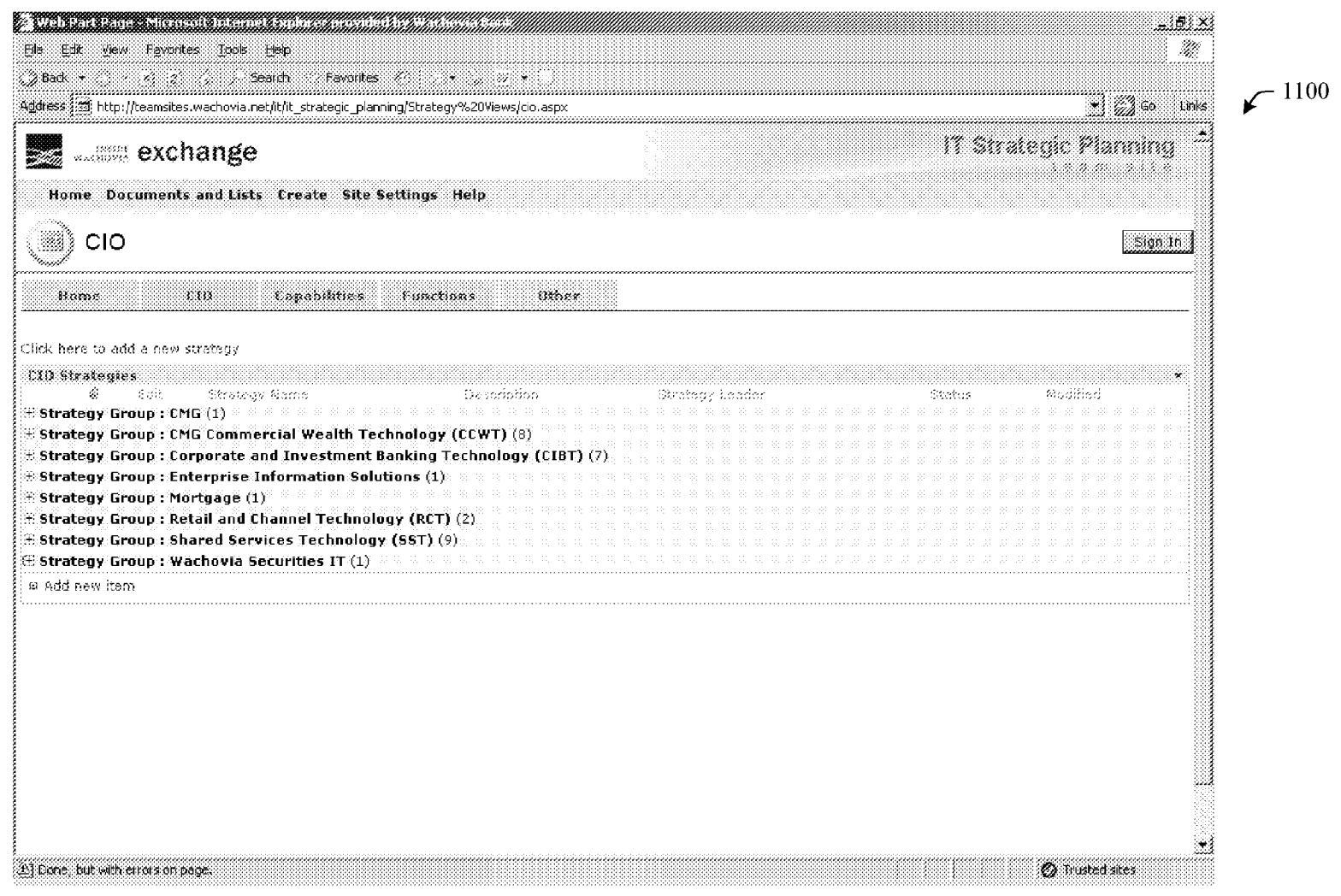
Figure 11B:
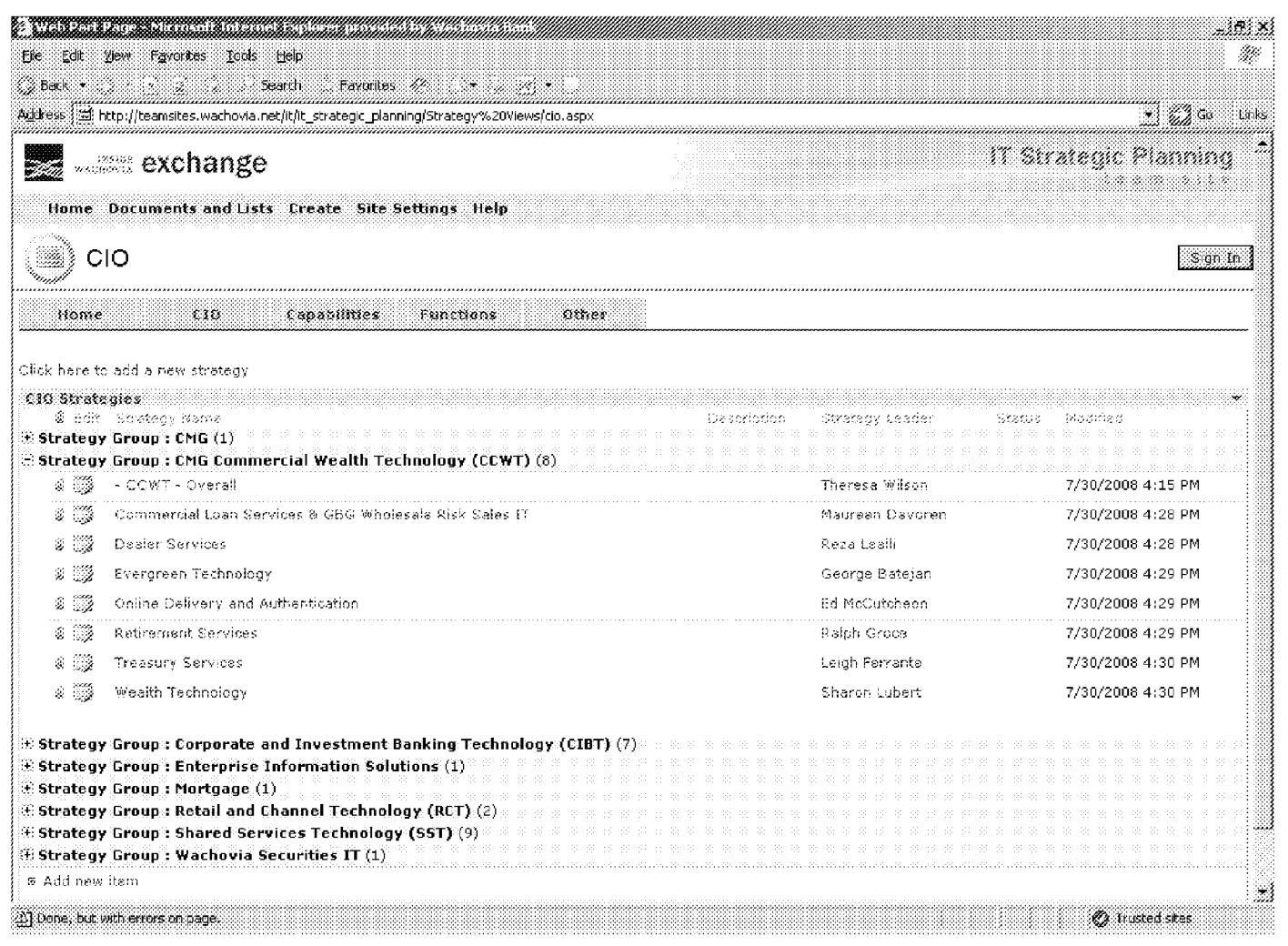

FIGS. 11A & B and 12A & B illustrate UI screen prints 1100 and 1200 respectively that relate to viewing, reporting and printing strategies. For ease of viewing strategies across CIO groups, capabilities, and functions, tabular views can be accessible from the home page. Within each of the tabs, a user can expand the types of strategies documented and view the core components of the strategy by selecting each of the view links. The user can also view and print a full report of the strategy. Access to the strategy overview maps and strategy timeline can also be added to these views as desired.

Figure 13:
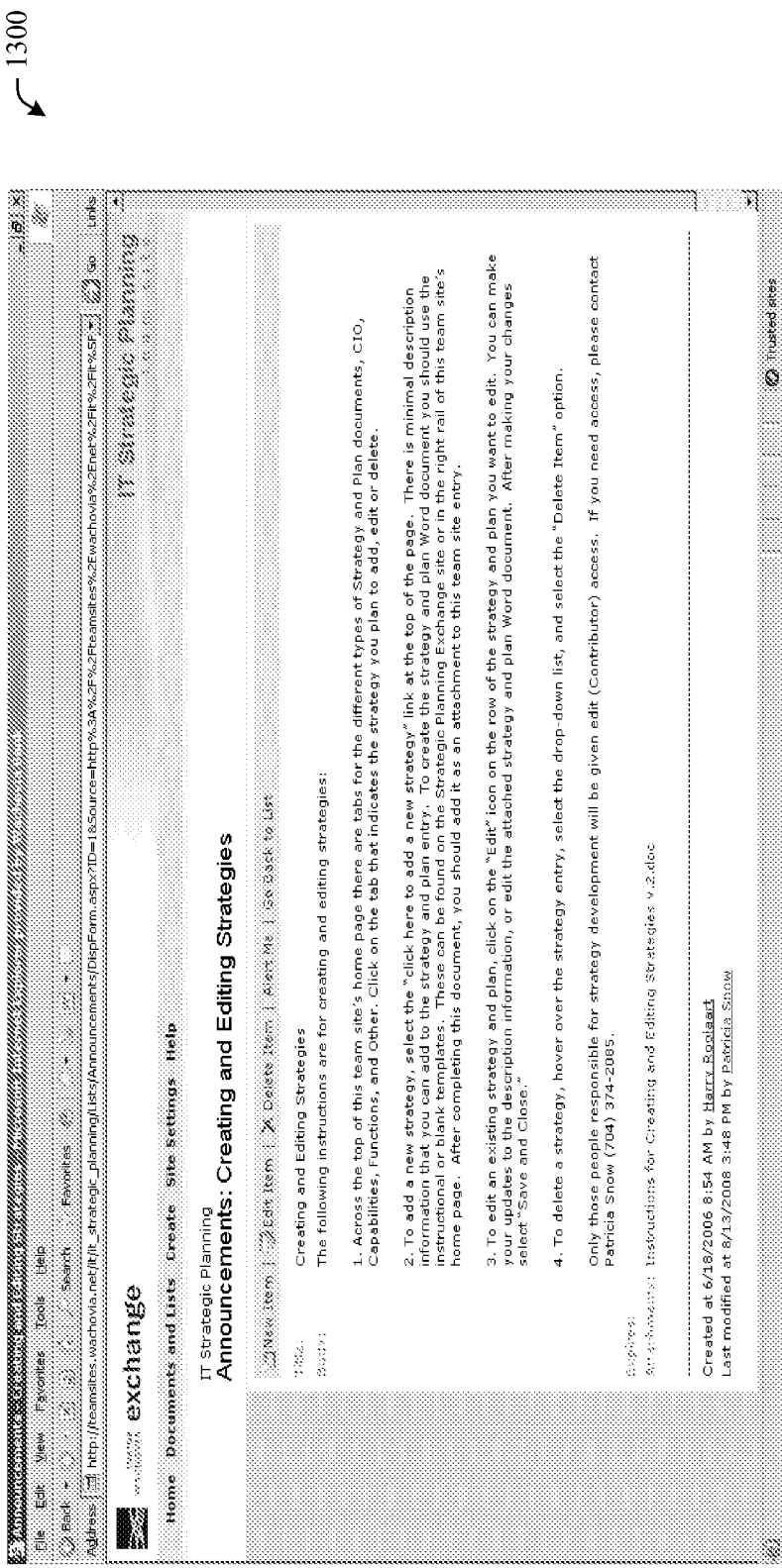
FIG. 13 illustrates an example UI instructions page for creating and editing strategy summaries in accordance with an aspect of the innovation.

FIG. 13 illustrates an example UI screen 1300 that facilitates creating and updating strategies in accordance with aspects of the innovation. For creating and updating strategies, the Strategy Summary Creation & Updates link (UI 1300) on the home page can be used rather than the tabular views. The team sites can be equipped with views set up specifically for creating and editing forms created within the team site as appropriate or desired. As will be understood, the navigation is often clearer using these views. The tabular views provide access and viewing of the strategy content.

After the user selects the Strategy Summary Creation & Updates link on the left navigation menu (as illustrated in UI 1300), a list of strategies will appear. To access an existing strategy, the user can select the icon to the left of the strategy title. If it is desired to create a new strategy, the new item option at the top of the page above the list of strategies can be selected. The list shows the most recently updated strategies, thus, it is possible to be able to easily find a desired strategy. It is to be appreciated that the configuration and layout of UI 1300 (as well as other UIs described herein) are examples of the features, functions and benefits of particular aspects of the innovation. As such, these specific aspects are not intended to limit the innovation in any manner. Rather, other aspects exist that include alternative content and configurations—these alternative aspects are to be included within the scope of the innovation and claims appended hereto.

Figure 14:
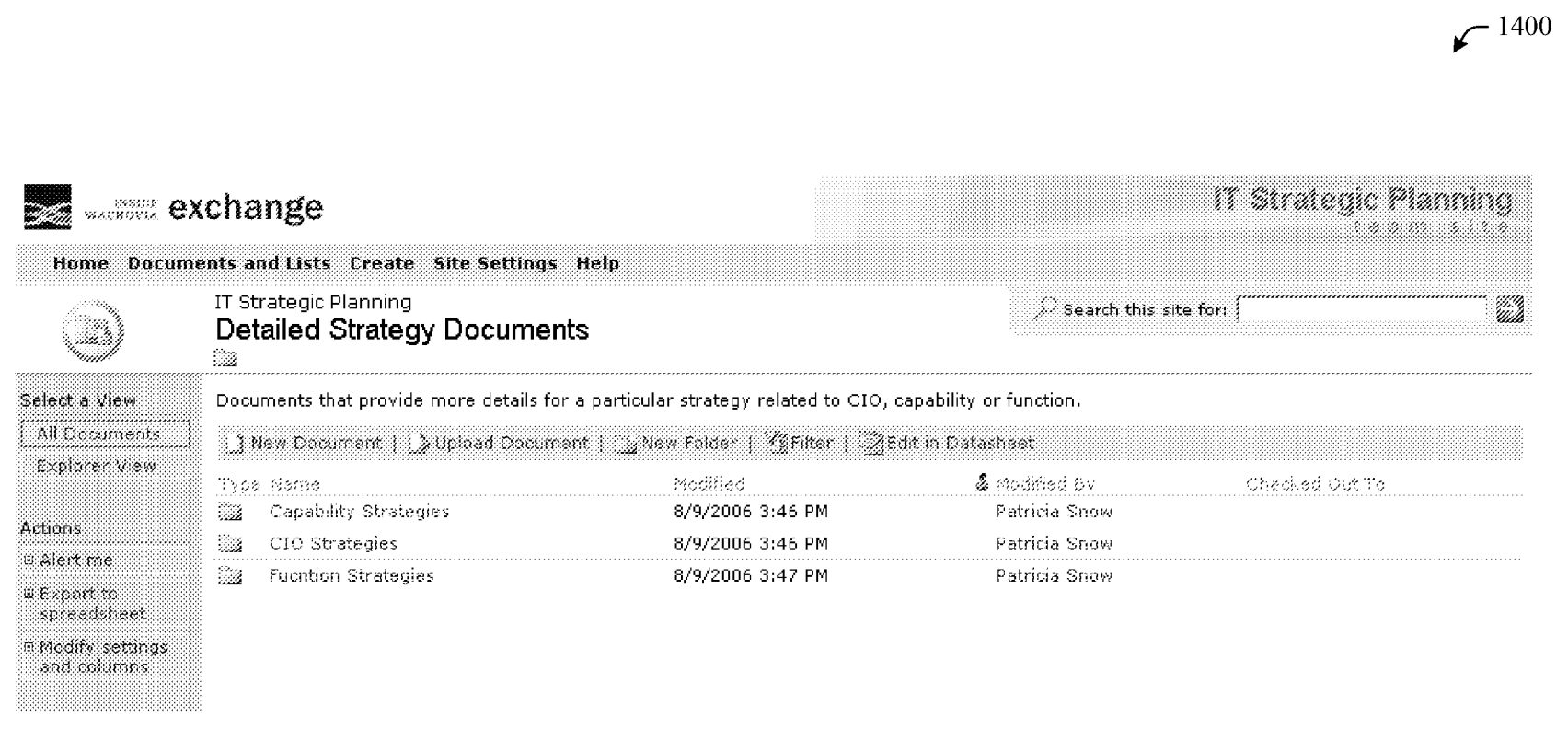

Turning now to FIG. 14, an example UI 1400 that facilitates viewing detailed strategies in accordance with aspects of the innovation is shown. In a particular aspect, for access to the detailed strategy documents, a user can select the Detailed Strategy Documents link located on the top left corner of the IT Strategic Planning team site as illustrated in UI 800 of FIG. 8. As shown in FIG. 14 and UI 1400, the detailed documents can be located in folders broken down by type of strategy.

Figure 15:
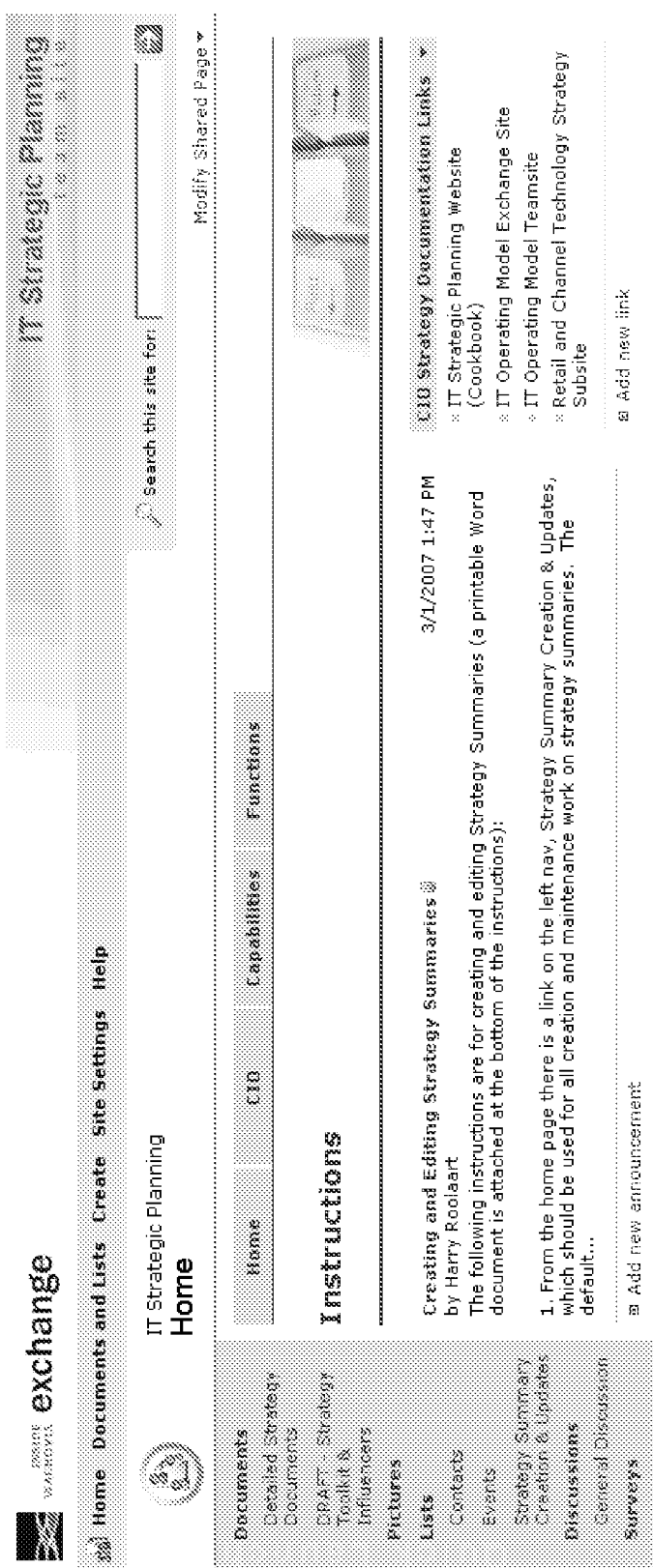
FIG. 15 illustrates an example home page that illustrates documentation links in accordance with aspects of the innovation.

With reference now to FIG. 15, the CIO Strategy Documentation Links can be employed to reference related topics. FIG. 15 illustrates an example home page UI 1500 that makes available strategy documentation links. In other words, to reference related topics, a user can employ the links on the rightmost section of the IT Strategic Planning home page (1500). Additionally, other useful links can be added by selecting the Add new link option as shown in UI 1500. The user can also communicate an additional request to one of the strategic planning contacts listed in the introduction of this document.

As described supra, in aspects, Web-based templates can be employed to enter or gather strategic planning data. In alternative aspects, word processing or other text-based templates or forms can be employed to gather data related to IT planning. An example portion (1600) of a template or form is illustrated in FIG. 16.

Figure 17:
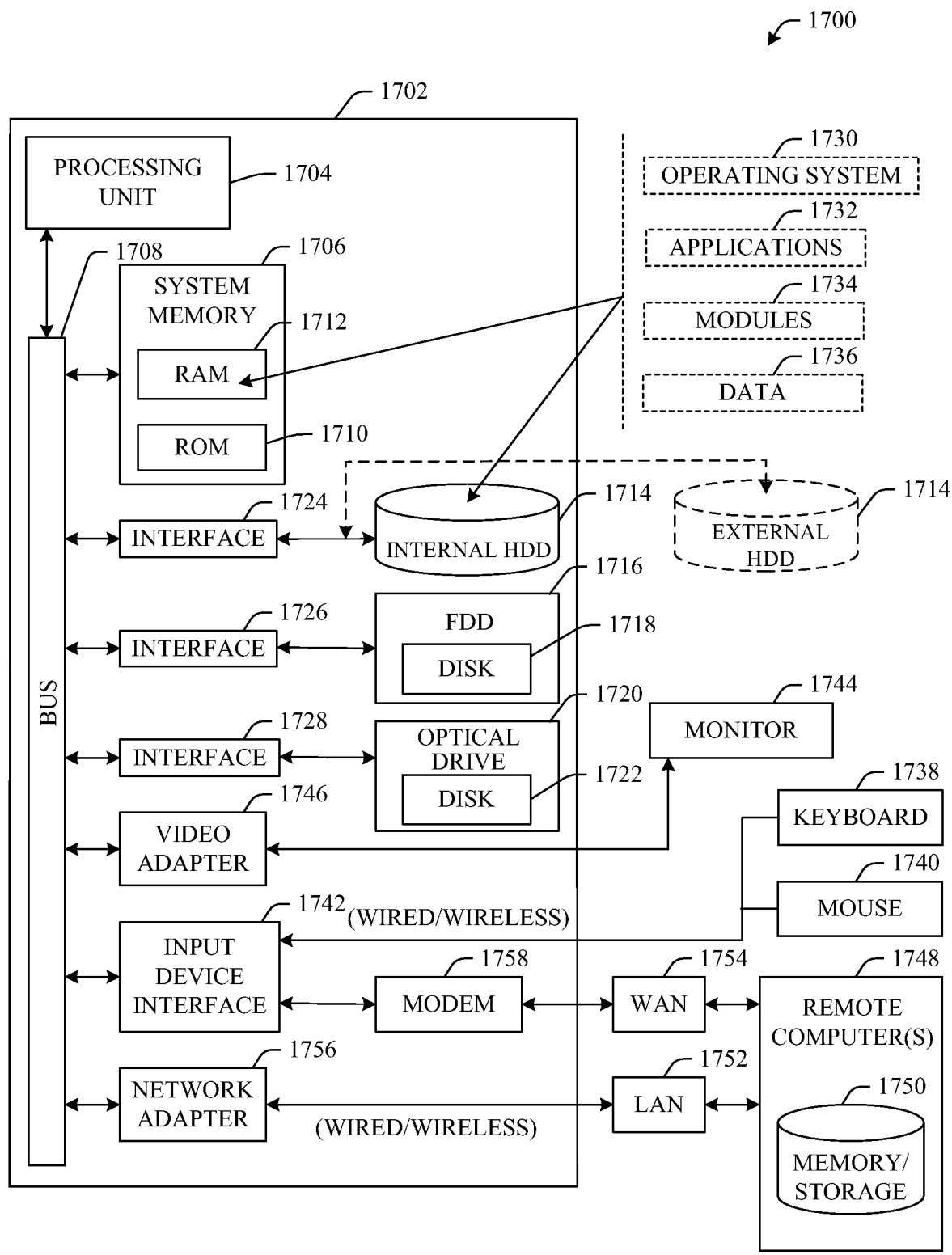
FIG. 17 illustrates a block diagram of a computer operable to execute the disclosed architecture.

Referring now to FIG. 17, there is illustrated a block diagram of a computer operable to execute the disclosed architecture. In order to provide additional context for various aspects of the subject innovation, FIG. 17 and the following discussion are intended to provide a brief, general description of a suitable computing environment 1700 in which the various aspects of the innovation can be implemented. While the innovation has been described above in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 17, the exemplary environment 1700 for implementing various aspects of the innovation includes a computer 1702, the computer 1702 including a processing unit 1704, a system memory 1706 and a system bus 1708. The system bus 1708 couples system components including, but not limited to, the system memory 1706 to the processing unit 1704. The processing unit 1704 can be any of various commercially available processors. Dual microprocessors and other multi-processor architectures may also be employed as the processing unit 1704.

The system bus 1708 can be any of several types of bus structure that may further interconnect to a memory bus (with or without a memory controller), a peripheral bus, and a local bus using any of a variety of commercially available bus architectures. The system memory 1706 includes read-only memory (ROM) 1710 and random access memory (RAM) 1712. A basic input/output system (BIOS) is stored in a non-volatile memory 1710 such as ROM, EPROM, EEPROM, which BIOS contains the basic routines that help to transfer information between elements within the computer 1702, such as during start-up. The RAM 1712 can also include a high-speed RAM such as static RAM for caching data.

The computer 1702 further includes an internal hard disk drive (HDD) 1714 (e.g., EIDE, SATA), which internal hard disk drive 1714 may also be configured for external use in a suitable chassis (not shown), a magnetic floppy disk drive (FDD) 1716, (e.g., to read from or write to a removable diskette 1718) and an optical disk drive 1720, (e.g., reading a CD-ROM disk 1722 or, to read from or write to other high capacity optical media such as the DVD). The hard disk drive 1714, magnetic disk drive 1716 and optical disk drive 1720 can be connected to the system bus 1708 by a hard disk drive interface 1724, a magnetic disk drive interface 1726 and an optical drive interface 1728, respectively. The interface 1724 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1702, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the innovation.

A number of program modules can be stored in the drives and RAM 1712, including an operating system 1730, one or more application programs 1732, other program modules 1734 and program data 1736. All or portions of the operating system, applications, modules, and/or data can also be cached in the RAM 1712. It is appreciated that the innovation can be implemented with various commercially available operating systems or combinations of operating systems.

A user can enter commands and information into the computer 1702 through one or more wired/wireless input devices, e.g., a keyboard 1738 and a pointing device, such as a mouse 1740. Other input devices (not shown) may include a microphone, an IR remote control, a joystick, a game pad, a stylus pen, touch screen, or the like. These and other input devices are often connected to the processing unit 1704 through an input device interface 1742 that is coupled to the system bus 1708, but can be connected by other interfaces, such as a parallel port, an IEEE 1394 serial port, a game port, a USB port, an IR interface, etc.

A monitor 1744 or other type of display device is also connected to the system bus 1708 via an interface, such as a video adapter 1746. In addition to the monitor 1744, a computer typically includes other peripheral output devices (not shown), such as speakers, printers, etc.

The computer 1702 may operate in a networked environment using logical connections via wired and/or wireless communications to one or more remote computers, such as a remote computer(s) 1748. The remote computer(s) 1748 can be a workstation, a server computer, a router, a personal computer, portable computer, microprocessor-based entertainment appliance, a peer device or other common network node, and typically includes many or all of the elements described relative to the computer 1702, although, for purposes of brevity, only a memory/storage device 1750 is illustrated. The logical connections depicted include wired/wireless connectivity to a local area network (LAN) 1752 and/or larger networks, e.g., a wide area network (WAN) 1754. Such LAN and WAN networking environments are commonplace in offices and companies, and facilitate enterprise-wide computer networks, such as intranets, all of which may connect to a global communications network, e.g., the Internet.

When used in a LAN networking environment, the computer 1702 is connected to the local network 1752 through a wired and/or wireless communication network interface or adapter 1756. The adapter 1756 may facilitate wired or wireless communication to the LAN 1752, which may also include a wireless access point disposed thereon for communicating with the wireless adapter 1756.

When used in a WAN networking environment, the computer 1702 can include a modem 1758, or is connected to a communications server on the WAN 1754, or has other means for establishing communications over the WAN 1754, such as by way of the Internet. The modem 1758, which can be internal or external and a wired or wireless device, is connected to the system bus 1708 via the serial port interface 1742. In a networked environment, program modules depicted relative to the computer 1702, or portions thereof, can be stored in the remote memory/storage device 1750. It will be appreciated that the network connections shown are exemplary and other means of establishing a communications link between the computers can be used.

The computer 1702 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10 BaseT wired Ethernet networks used in many offices.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates strategic IT (information technology) planning, comprising:
   at least one processor coupled to a memory, the processor executing:

an assessment component that reviews a current business state of a business;

an analysis component that evaluates the current business state and establishes a focus strategy, wherein the analysis component generates one or more queries related to weaknesses of the business, and wherein the focus strategy is based at least in part on responses to the one or more queries;

a summary manager component that employs the focus strategy to generate one or more forms; and at least one user interface that collects first information via the one or more forms, wherein the summary manager component aggregates the collected information and generates a strategy summary based at least in part on a subset of the first information and on second information associated with one or more prior strategies.

2. The system of claim 1, the focus strategy is at least one of a two- or three-year strategy.

3. The system of claim 1, wherein the aggregation of information is facilitated via a Web-based interface page.

4. The system of claim 1, wherein the aggregation of information is facilitated via a text-based document.

5. The system of claim 1, wherein the strategy summary includes at least one of vision & rationale for change, current state, future state, initiatives & financial projections, strategy timeline or strategy metrics.

6. The system of claim 1, wherein the assessment component employs a plurality of strategy influencers that influence the strategy.

7. The system of claim 6, wherein the plurality of influencers include at least one of internal or external influencers.

8. The system of claim 7, wherein the internal influencers include at least one of corporate policies, business strategies, IT goals & objectives, IT performance, IT challenges, capability & function analysis, risk analysis, financial analysis, workforce management analysis, application portfolio analysis, policies & standards, quality management or future state process models.

9. The system of claim 7, wherein the external influencers include at least one of industry trends & emerging technologies, globalization, vendor management or benchmarking.

10. The system of claim 1, further comprising a collaboration component that facilitates collaboration of individuals based upon the strategy summary, wherein the collaboration generates at least one of comments and suggested revisions to the strategy summary.

11. The system of claim 10, wherein the at least one of comments and suggested revisions are incorporated into a revised strategy summary based in part upon the strategy summary.

12. The system of claim 11, further comprising a management approval component that facilitates presentation of the revised strategy summary to management for approval, wherein the presentation employs a series of searchable visual interfaces.

13. The system of claim 12, further comprising a deployment component that facilitates communication of the approved revised strategy summary to one of team members or stakeholders.

14. A computer-implemented method of strategically planning information technology (IT), comprising:

storing computer executable instructions on a memory;

employing a processor that executes the computer executable instructions stored on the memory to implement the following acts:

reviewing current state of a business scenario by way of a user interface (UI);

reviewing a plurality of strategy influencers that relate to the business scenario via the UI;

generating one or more queries related to the business scenario;

analyzing the current state based upon a subset of the strategy influencers, wherein the analysis reveals a plurality of findings and priorities, wherein the plurality of findings and priorities is based at least in part on one or more of inputs or drivers identified by responses to the one or more queries;

reviewing a strategy repository for information associated with one or more prior strategies; and creating a strategy summary based at least in part upon the information associated with the one or more prior strategies and a subset of the findings or priorities.

15. The computer-implemented method of claim 14, further comprising employing the UI to facilitate collaboration, wherein the collaboration identifies revisions to the strategy summary.

16. The computer-implemented method of claim 15, further comprising presenting the revised strategy summary to leadership for approval.

17. The computer-implemented method of claim 16, further comprising communicating the approved strategy summary to stakeholders.

18. A computer-executable system, comprising:

at least one processor coupled to a memory, the processor executing:

means for establishing a current state of a business function based at least in part upon a plurality of strategy influencers;

means for determining a primary focus based at least in part upon the current state; and means for one of creating or updating a strategy summary as a function of the primary focus of the business, wherein the strategy summary identifies one or more strategic objectives and is based at least in part on financial projections that are based at least in part on the primary focus and on a plurality of dimensions comprising one or more of a workforce management dimension, a technology dimension, a process dimension, or a delivery dimension, and wherein the means for one of creating or updating additionally generates a strategy map that connects the one or more strategic objectives to each other via one or more cause-and-effect relationships.

19. The computer-executable system of claim 18, further comprising means for soliciting comments or revisions to the strategy summary from a plurality of leaders.

20. The computer-executable system of claim 19, further comprising:

means for obtaining approval for the strategy summary; and means for communicating the strategy summary to a plurality of stakeholders.

* * * * *